United States Patent
Barnes et al.

(10) Patent No.: US 11,307,856 B2
(45) Date of Patent: Apr. 19, 2022

(54) BRANCH TARGET VARIANT OF BRANCH-WITH-LINK INSTRUCTION

(71) Applicant: Arm Limited, Cambridge (GB)

(72) Inventors: Graeme Peter Barnes, Cambridge (GB); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/971,755

(22) PCT Filed: Feb. 13, 2019

(86) PCT No.: PCT/GB2019/050379
§ 371 (c)(1),
(2) Date: Aug. 21, 2020

(87) PCT Pub. No.: WO2019/175530
PCT Pub. Date: Sep. 19, 2019

(65) Prior Publication Data
US 2021/0109755 A1    Apr. 15, 2021

(30) Foreign Application Priority Data
Mar. 16, 2018 (GB) .................................... 1804231

(51) Int. Cl.
*G06F 9/30* (2018.01)
*G06F 9/32* (2018.01)

(52) U.S. Cl.
CPC ........ *G06F 9/30145* (2013.01); *G06F 9/3005* (2013.01); *G06F 9/32* (2013.01)

(58) Field of Classification Search
None
See application file for complete search history.

(56) References Cited

U.S. PATENT DOCUMENTS

| 5,953,530 A * | 9/1999 | Rishi ................... G06F 11/3636 717/127 |
| 9,448,796 B2 * | 9/2016 | Greiner ................... G06F 9/528 |

(Continued)

FOREIGN PATENT DOCUMENTS

| WO | 2017/032969 | 3/2017 | |
| WO | WO-2017032969 A1 * | 3/2017 | ......... G06F 9/30192 |

OTHER PUBLICATIONS

Borin, E. etal., Software-Based Transparent and Comprehensive Control-Flow Error Detection, 2006, IEEE, 13 pages. (Year: 2006).*

(Continued)

*Primary Examiner* — Eric Coleman
(74) *Attorney, Agent, or Firm* — Nixon & Vanderhye P.C.

(57) ABSTRACT

An apparatus (2) comprises an instruction decoder (6) and processing circuitry (4). The instruction decoder (6) supports branch instructions for triggering a non-sequential change of program flow to an instruction at a target address, including: a branch-with-link instruction for which a return address is set for a subsequent return of program flow; and at least one target-checking type of branch instruction, for which when the branch is taken an error handling response is triggered when the instruction at the target address is an instruction other than at least one permitted type of branch target instruction. For at least a subset of the at least one target-checking type of branch instruction, a branch target variant of the branch-with-link instruction is a permitted type of branch target instruction.

15 Claims, 5 Drawing Sheets

(56) References Cited

U.S. PATENT DOCUMENTS

| | | | |
|---|---|---|---|
| 2002/0174327 A1* | 11/2002 | Kruckemyer | G06F 9/3806 |
| | | | 712/234 |
| 2005/0149781 A1* | 7/2005 | Lempel | G06F 11/1064 |
| | | | 714/718 |
| 2013/0024676 A1 | 1/2013 | Glew et al. | |
| 2013/0036464 A1 | 2/2013 | Glew et al. | |
| 2016/0246604 A1* | 8/2016 | Winrow | G06F 9/3804 |
| 2017/0090933 A1* | 3/2017 | Day | G06F 9/3802 |
| 2017/0300688 A1 | 10/2017 | Spisak et al. | |

OTHER PUBLICATIONS

Shrivastava, A., etal., Quantitative Analysis of Control Flow Checking Mechanisms for Soft Errors, 2014, ACM, 6 pages. (Year: 2014).*

International Search Report and Written Opinion of the ISA for PCT/GB2019/050379, dated May 6, 2019, 16 pages.

Search and Examination Report for GB1804231.7, dated Oct. 5, 2018, 6 pages.

"Hardware Control Flow Integrity (CFI) for an IT Ecosystem", NSA Information Assurance, Apr. 2015, 19 pages.

Robert Bedichek, "Some Efficient Architecture Simulation Techmques," Proceedings of the Winter 1990 USENIX Conference, Jan. 22-26, 1990, 12 pages.

* cited by examiner

BRANCH TARGET VARIANT OF BRANCH-WITH-LINK INSTRUCTION

This application is the U.S. national phase of International Application No. PCT/GB2019/050379 filed 13 Feb. 2019, which designated the U.S. and claims priority to GB Patent Application No. 1804231.7 filed 16 Mar. 2018, the entire contents of each of which are hereby incorporated by reference.

The present technique relates to the field of data processing.

Branch instructions are instructions for triggering a non-sequential change of program flow when executing instructions from a given piece of program code. Some branches may be static branches whose target address is always fixed or is determined by a fixed offset from the current instruction address. However other branches are data-dependent branches where the target address identifying the instruction to be executed following the branch (if the branch is taken) depends on data read from memory or generated by earlier instructions. For example, data dependent branches may be used to ensure that certain functions are executed conditionally depending on the outcome of earlier parts of the program.

One form of attack against a processor may be to attempt to corrupt the data which controls the direction of program flow by data-dependent branch instructions so as to trick the branch instruction into branching to an instruction at a target address that was unintended by the author of the program code. Such exploits can allow an attacker to string together sections of legitimate instructions which are part of the correct program code to be executed, but in a different sequence to the intended sequence. Such attacks could prevent the program functioning correctly, cause other undesirable effects on the processor executing the program, or bypass certain security measures such as password checks.

At least some examples provide an apparatus comprising: an instruction decoder to decode instructions; and processing circuitry to perform data processing in response to instructions decoded by the instruction decoder; in which: in response to a branch instruction, the instruction decoder is configured to control the processing circuitry to trigger a non-sequential change of program flow to an instruction at a target address; when the non-sequential change of program flow is triggered in response to a branch-with-link instruction, the instruction decoder is configured to control the processing circuitry to set a return address for a subsequent return of program flow; when the non-sequential change of program flow is triggered in response to at least one target-checking type of branch instruction, the instruction decoder is configured to control the processing circuitry to trigger an error handling response when the instruction at the target address is an instruction other than at least one permitted type of branch target instruction; and for at least a subset of said at least one target-checking type of branch instruction, said at least one permitted type of branch target instruction includes a branch target variant of the branch-with-link instruction.

At least some examples provide a data processing method comprising: in response to a branch instruction, triggering a non-sequential change of program flow to an instruction at a target address; when the non-sequential change of program flow is triggered in response to a branch-with-link instruction, setting a return address for a subsequent return of program flow; and when the non-sequential change of program flow is triggered in response to at least one target-checking type of branch instruction, triggering an error handling response when the instruction at the target address is an instruction other than at least one permitted type of branch target instruction; wherein for at least a subset of said at least one target-checking type of branch instruction, said at least one permitted type of branch target instruction includes a branch target variant of the branch-with-link instruction.

At least some examples provide a computer program for controlling a host data processing apparatus to provide an instruction execution environment for execution of instructions of target program code, comprising: instruction decode program logic to decode instructions of the target program code; and processing program logic to perform data processing in response to instructions decoded by the instruction decode program logic; in which: in response to a branch instruction, the instruction decode program logic is configured to control the processing program logic to trigger a non-sequential change of program flow to an instruction at a target address; when the non-sequential change of program flow is triggered in response to a branch-with-link instruction, the instruction decode program logic is configured to control the processing program logic to set a return address for a subsequent return of program flow; when the non-sequential change of program flow is triggered in response to at least one target-checking type of branch instruction, the instruction decode program logic is configured to control the processing program logic to trigger an error handling response when the instruction at the target address is an instruction other than at least one permitted type of branch target instruction; and for at least a subset of said at least one target-checking type of branch instruction, said at least one permitted type of branch target instruction includes a branch target variant of the branch-with-link instruction.

A storage medium may be provided to store the computer program described above. The storage medium may be a non-transitory storage medium.

Further aspects, features and advantages of the present technique will be apparent from the following description of examples, which is to be read in conjunction with the accompanying drawings, in which.

Figure 1:
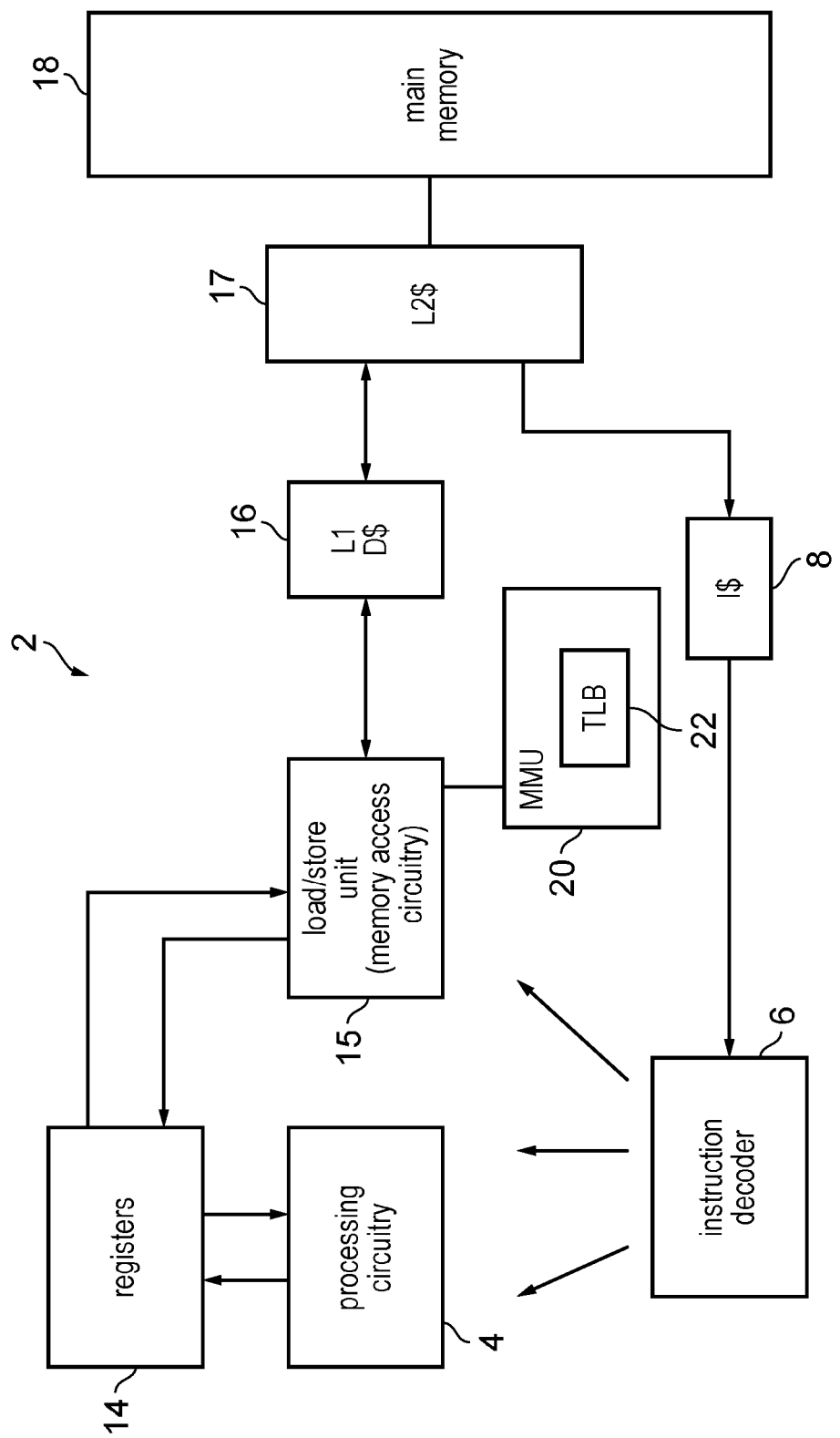
FIG. 1 illustrates an example of a data processing apparatus.

One technique for guarding against attacks aimed at controlling the data which controls the program flow provided by branch instructions may be to provide an instruction decoder which supports at least one permitted type of branch target instruction, which can be used to mark the safe branch target points of the program, which the author of the program code intended to be legitimate targets for branches. When a non-sequential change of program flow is triggered in response to at least one target-checking type of branch instruction, the processing circuitry may check whether an instruction at the target address is at least one permitted type of branch target instruction. When the instruction at the target address is an instruction other than the at least one permitted type of branch target instruction, then an error handling response may be triggered. For example the error handling response could be signalling an exception, or storing status information indicating that a fault has been detected. In this way, the architecture may provide a mechanism for detecting when there has been an unintended change of program flow and so attacks of the form discussed above can be made significantly harder since it is no longer possible to branch to an arbitrary point in the program other than the points marked by the permitted type of branch target instruction.

One type of branch instruction is a branch-with-link instruction. When a non-sequential change of program flow is triggered in response to a branch-with-link instruction, the instruction decoder may control the processing circuitry to set a return address for a subsequent return of program flow. For example the return address may be stored to a particular register, for example known as the "link register". A subsequent return branch instruction may read the return address and then trigger a change of program flow back to the address represented by the return address. This functionality can be useful for calling a function using the branch-with-link instruction and then subsequently returning processing to the previously executed part of the program once the function has completed. Use of the branch-with-link instruction can enable the same function to be called from multiple different locations within the program, as the return address can be used to effectively remember the part of the program from which the function was called.

Protection against the form of attacks discussed above can be implemented for branch-with-link instructions by including a subsequent permitted type of branch target instruction after the branch-with-link instruction. However, in this case the number of instructions in the program increases and as branch-with-link instructions are relatively common, this can increase the overall code volume by a significant amount. For example it has been estimated in typical programs that including a branch target instruction after each branch-with-link instruction in code of average length and average level of usage of branch-with-link instructions could grow the number of instructions by around 6%. Increasing the size of code required for a given program can result in less efficient cache usage and pipeline utilisation which can affect performance.

In the technique discussed above, a branch target variant of the branch-with-link instruction may be provided, which is treated as one of the at least one permitted type of branch target instruction for at least a subset of the at least one target-checking type of branch instruction. Hence, it is not necessary to include a separate branch target instruction after the branch-with-link instruction, as the branch-with-link instruction itself can act as the permitted type of branch target instruction so that a non-sequential change of program flow back to the branch-with-link instruction can be treated as a valid entry point. This exploits the fact that, due to the link and return behaviour of branch-with-link instructions, the instruction following the branch-with-link instruction would almost always be expected to be a valid branch target point and so separately indicating an explicit branch target instruction may be redundant. Instead, the branch-with-link instruction can implicitly behave as the permitted type of branch target instruction itself. This helps to reduce the total code volume which can improve performance of instruction caches and instruction processing pipelines.

The setting of the return address in response to a branch-with-link instruction may vary depending on whether the branch-with-link instruction is the branch target variant. In response to a branch-with-link instruction other than the branch target variant, the processing circuitry may set the return address to an address of the next instruction which sequentially follows the branch-with-link instruction. On the other hand, in response to the branch target variant of the branch-with-link instruction, the return address may be set to an address of the branch target variant of the branch-with-link instruction itself. This means that the branch target variant of the branch-with-link instruction can act as the branch target instruction since a subsequent return branch will branch back to the same branch-with-link instruction. While this behaviour means that the branch target variant and non-branch target variant of the branch-with-link instructions set the return address differently, in practice it is rare for the return address to be referenced by any instructions within a function other than the return branch itself. This means it is unlikely that the indeterminate definition of the return address within the function (the address varying based on whether the function was called by a branch target variant or non-branch target variant of the branch-with-link instruction) would cause significant problems (in any case, code which does need to use a deterministic definition of the return address within the function body could pass the address as an additional function argument in other ways if necessary). In practice most code can benefit from reduced code volume by allowing a variant of the branch-with-link instruction to set the return address to its own address so that it can itself act as the permitted branch target address.

The behaviour of the branch target variant of the branch-with-link instruction may vary depending on whether program flow passes to the branch-with-link instruction sequentially or non-sequentially. When program flow passes non-sequentially from a branch instruction of the at least one target-checking type to the branch target variant of the branch-with-link instruction, then any non-sequential change of program flow associated with the branch target variant of the branch-with-link instruction may be suppressed so that instead the next instruction executed after the branch target variant of the branch-with-link instruction may simply be the next instruction following on sequentially from the branch-with-link instruction. This recognises that when program flow passes non-sequentially from a branch instruction of the at least one target checking type to the branch target variant of the branch-with-link instruction, then this means that the branch represented by the branch-with-link instruction will typically already have been carried out and now program flow is returning to the branch-with-link instruction, with the branch-with-link instruction acting as a branch target instruction.

On the other hand, when program flow passes sequentially to the branch target variant of the branch-with-link instruction (i.e. the branch-with-link instruction is encountered for the first time before the branch is taken), then the non-sequential change of program flow may be permitted (if taken—note that whether a branch is taken or not may also depend on other conditional information). Also, in cases where not all branches are treated as the target checking type of branch instruction, then when program flow passes non-sequentially from a branch instruction other than the target checking type to the branch target variant or the branch-with-link instruction, then the non-sequential change of program flow associated with the branch-with-link instruction may still be permitted.

In other words, when passing sequentially to the branch target variant of the branch-with-link instruction or branching to the branch target variant of the branch-with-link instruction from a branch which does not require a check of the instruction at the target address to see whether it is a branch target instruction, the branch-with-link instruction may be treated as a standard branch-with-link instruction which does trigger a non-sequential change of program flow (if any other conditional requirements are satisfied). On the other hand, when program flow passes non-sequentially to the branch target variant of the branch-with-link instruction from a branch which does require checking of whether the instruction at the target address is the permitted type of branch target instruction, then the instruction is treated as a branch target instruction which may provide a no-operation behaviour at an architectural level so that any branch (non-sequential change of program flow) associated with the instruction is suppressed. This dual behaviour of the same instruction enables a reduction in code volume by avoiding the need to provide separate instructions for these two purposes.

In the present application, the term "branch instruction" may refer to any instruction which can trigger a non-sequential change of program flow. This may include certain types of branch instruction which are explicitly defined as branches, e.g. with an instruction opcode marking the instruction as a branch instruction. However, the branch instruction could also be another type of instruction which has an opcode signifying some other type of processing operation, but which specifies as its destination register the register providing the program counter which controls the current point of program flow reached in the program. For example the branch instruction could be an arithmetic instruction, logical instruction, load instruction, or register move instruction (an instruction for moving a data value from one register to another), which specifies as its destination register the program counter register.

In some implementations all branch instructions may be treated as the at least one target-checking type of branch instruction, for which a check of the instruction at the branch target address is performed, and an error handling response is triggered if the instruction at the target address is not one of the permitted types of target instruction. However, in other examples the check of the instruction at the branch target address may only be required for certain target-checking types of branch instructions, and this check may be omitted for other types of branch instructions. For example, static branches which always branch to the same location (using either a fixed absolute target address or relative target address defined relative to the address of the branch instruction using an offset which does not depend on data derived from earlier parts of the program) may not need the check of the instruction at the target address, since it would not be possible to corrupt such branches through modifying branch control data. Hence, in some cases the check of the instruction at the target address may be performed only for data-dependent branches whose target address depends on data derived from earlier instructions.

The branch target variant of the branch-with-link instruction could in some implementations be treated as a permitted type of branch target instructions for all target-checking types of branch instruction. However, in other examples the branch target variant of a branch-with-link instruction may be a permitted type of branch target instruction for a certain (restricted) subset of the target-checking types of branch instruction. For example, only branch instructions which could be used to branch to the return address stored in the link register could be permitted to branch to a branch target variant of the branch-with-link instruction, and other branches which do not branch to the return address could still trigger the error handling response if the instruction at the target address is the branch target variant of the branch-with-link instruction.

Hence, in some cases, for a first target-checking type of branch instruction, the branch target variant of the branch-with-link instruction may be one of the at least one permitted type of branch target instruction, while for a second target-checking type of branch instruction, the branch target variant of the branch-with-link instruction is not one of the at least one type of permitted branch target instruction. By restricting the subset of target-checking types of branch instruction for which the branch target variant of the branch-with-link instruction is a valid type of permitted type of branch target instruction, this reduces the scope for attackers to redirect program flow in ways not intended by the program or compiler which generated the code, improving security.

In some cases, more than one branch target variant of the branch-with-link instruction could be defined. The different variants of the branch-with-link instruction could be treated as a permitted type of branch target instruction for different subsets of target-checking types of branch instructions. For example, a first branch target variant of the branch-with-link instruction may be one of the at least one type of permitted branch target instruction for a first subset of target-checking types of branch instruction, and a second branch target variant of the branch-with-link instruction may be the permitted type of branch target instruction for a second (different) subset of target-checking types of branch instruction.

By being more specific in which types of target checking type of branch instruction are allowed to branch to a given variant of the branch-with-link instruction, this again would reduce the scope for an attacker to trigger undesirable behaviour. For example, one of the target-checking types of branch instruction may be a dedicated return branch instruction which always branches to the address in the link register set up by a previous branch-with-link instruction.

Some implementations may support a variant of the branch-with-link instruction which is only treated as the permitted type of branch target instruction for that dedicated return branch instruction, but is not one of the permitted types of branch target instructions for other more general types of branches which accept an arbitrary target address other than the return address.

On the other hand, some program code may use a general type of branch specifying the link register as the source register for its target address in order to control return branches after processing a function, and in this case then it may be desirable to also make the branch target variant of the branch-with-link instruction be one of the permitted branch target instructions for such general branches.

By defining both the first branch target variant which is a valid branch target for the return branch only, and a second branch target variant which may be allowed to be targeted by either the return branch or the more general form of branch, this allows compilers or programmers to choose which variant they wish to use depending on the level of security required. The first variant may be more secure but may require more tighter programming requirements since it is no longer possible to use the general branch as a branch back to the return address, while the second variants may permit looser programming practises but may have some additional vulnerability as it may mean that a different general branch not actually intended to implement a return could validly branch to the location of the branch-with-link instruction. Hence, by supporting different forms of branch-with-link instructions supporting different subsets of target checking types of branch instructions validly branching to the branchwith-link instruction, this offers flexibility for programmers to trade off security against ease of programming.

In some implementations the branch target variant of the branch-with-link instruction may have a different encoding to another variant of the branch-with-link instruction which is not treated as one of the different types of branch instruction. Also, the first/second branch target variants of the branch-with-link instruction discussed above could be defined using different instruction encodings.

However in other examples the branch target variant of the branch-with-link instruction may have the same encoding as another variant of the branch-with-link instruction which is not the permitted type of branch target instruction, or the first/second branch target variants may have the same encoding. In this case, the instruction decoder or processing circuitry may determine the particular variant of a given branch-with-link instruction (e.g. whether it is the branch target variant or another, non-branch-target, variant, or whether the branch target variant is the first branch target variant or the second branch target variant) based on at least one parameter other than the instruction encoding of the given branch-with-link instruction.

For example, the at least parameter could be a configuration parameter stored in a configuration register. This can make it easier to write code which can operate correctly both on legacy systems which do not have architecture supporting the functionality of the branch target variant of the branch-with-link instruction, and newer machines written to respond to the branch target variant of the branch-with-link instruction with the different return address setting behaviour and the different behaviour on non-sequential and sequential passing of program flow to the branch target variant as discussed above. By using exactly the same encoding for both the branch target variant and non-branch target variant of the branch-with-link instruction, the same code can execute on both devices. However the apparatus which does support the functionality of the branch target variant(s) can have a configuration register with a parameter specifying that the branch target variant functionality has been activated. For example, a configuration register could be used which in legacy systems, has a spare bit hardwired set by default to a fixed value, so that all apparatuses may by default treat all branch-with-link instructions as the non-branch target variant. However in newer devices this bit of the configuration register could be set to a different value, to indicate that the branch-with-link instructions should be treated as the branch target variant so that they may legitimately be targeted by return branches without needing a separately encoded branch target instruction.

Other examples of the parameter which could determine the variant of a branch-with-link instruction can be provided. In one example, the at least one parameter can comprise an instruction address of the branch-with-link instruction. For example, branch-with-link instructions at certain parts of the program code could be treated as the branch target variant, while in other parts of the program code branch-with-link instructions can be treated as the non-branch-target variant. This may allow some parts of the code to have a more restricted set of permitted branch target instructions than others depending on the level of security required for the particular portion of code.

Also, the parameter controlling the behaviour of the branch-with-link instruction could be an instruction address of a given target checking type of branch instruction which causes program flow to pass non-sequentially to a given branch-with-link instruction. That is, the address of the return branch which causes program flow to pass back to a given branch-with-link instruction could determine the variant of the branch-with-link instruction, e.g. whether the instruction is treated as a first branch target variant (which can be validly targeted by a first subset of branch types) or the second branch target variant (which can be validly targeted by a second subset of branch types). This could be useful, for example, in cases where older code is stored at a first address range and newer code stored at a second address range. The older code could use a wider set of branch instruction types for return branches, so that branch-with-link instructions branched to from branch instructions in the address range of the older code may be preferred to be a variant that allows a wider subset of branch types to validly target the branch-with-link instruction. On the other hand, for newer code compiled to use a more restricted subset of branch types to perform return branches, security can be improved by interpreting the branch-with-link instruction as a different variant which acts as a valid branch target instruction for a more restricted subset of branch types. Hence, by selecting the variant based on the address of the branch which branches to the branch-with-link, this can allow a better balance between compatibility with legacy code and increased security for newer code.

With this approach, if an exception is taken just after the given target checking type of branch instruction is encountered, but before processing of the given branch-with-link instruction, then information may be recorded to assist with determining the variant of the given branch-with-link instruction. For example, this information could be recorded as part of the state captured when taking the exception, or by modifying one or more bits of the exception return address (e.g. unused bits in a most significant or least significant portion of the address). This means that when returning from the exception, the relevant property of the branch instruction which was triggered just before the exception would not be lost, so that the appropriate behaviour of the branch-with-link instruction can be determined on resuming processing after the exception.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
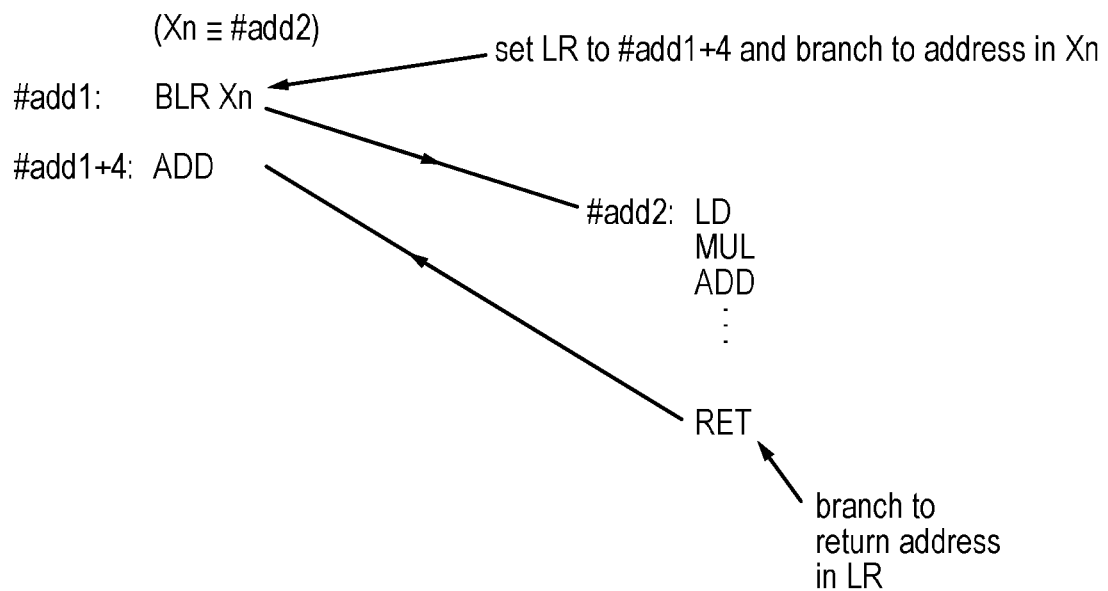
FIG. 2 illustrates behaviour of a branch-with-link instruction.

FIG. 2 shows an example of processing of a branch-with-link instruction. In FIG. 2, the branch-with-link instruction is a register-specifying form of the instruction which specifies a source register Xn indicating a target address of the instruction to which program flow is to be directed when the branch is taken. It will be appreciated that in other examples the target address could be defined by an immediate value specified in the instruction encoding of the branch-with-link instruction, instead of in a register. The immediate value or the register value could identify the target address as an absolute address, or as a relative value which is used to compute the target address relative to the address of the branch-with-link instruction. Hence, a range of ways of encoding the target address can be provided. In the examples of FIG. 2 and subsequent examples, the branch-with-link instruction is an unconditional branch which unconditionally triggers a non-sequential change of program flow at the instruction at the target address. However, the present technique can also be applied to conditional branches where the processing circuitry determines whether or not to take the branch depending on a source operand or condition status code represented in the registers 14, which may depend on outcomes of previous instructions.

Unlike other types of branches, for a branch-with-link instruction, in addition to the change of program flow, when the branch is taken a link register provided within registers 14 is also updated with a return address determined depending on the address of the branch-with-link instruction. For the non-branch target variant of the branch-with-link instruction shown in FIG. 2, the return address in the link register is set to the address of the next instruction which follows sequentially from the branch-with-link instruction. For example, if the offset between the addresses of successive instructions is 4, then the link register may have its return address set to #add1+4, where #add1 is the address of the branch-with-link instruction. When the branch-with-link instruction is executed then it branches to some function code at the target address (#add2 in this example). When a subsequent return branch instruction (RET) is encountered, then this triggers a return branch to the instruction whose address is indicated as the return address in the link register which in this example causes processing to be directed to the add instruction ADD (at address #add1+4) which follows the branch-with-link instruction BLR. While FIG. 2 shows a dedicated type of return branch instruction RET, it is also possible to use more general forms of branch instruction to branch to the address in the link register, by specifying the link register as the source register which defines the target address of the branch.

Figure 3:
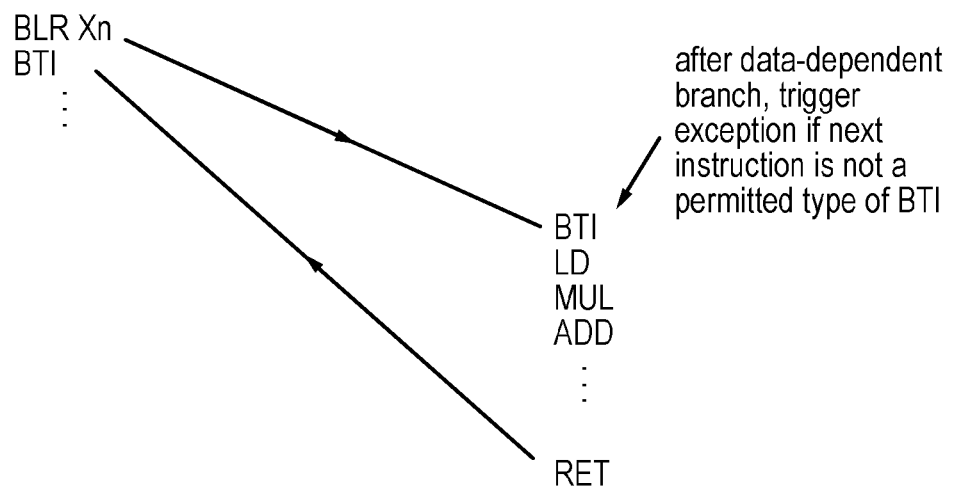
FIG. 3 illustrates for comparison a sequence of instructions including a branch-with-link instruction and a separate branch target instruction.

FIG. 3 illustrates use of a branch target instruction (BTI) for protecting against attacks aimed at corrupting the return address. For example, when nested function calls are made, the return address set by the branch-with-link instruction may be placed on a stack. While the return address is on the stack, an attacker may be able to corrupt the data on the stack, to change the return address to a different value from the one originally intended by the branch-with-link instruction, in an attempt to trick the processor into branching to a different part of the program not intended by the programmer or compiler authoring the code being executed. Some branches may be target checking branch instructions, for which the processor checks whether the instruction at the target address of the branch is a branch target instruction (BTI). This can allow the programmer/compiler to mark the safe branch target points with the branch target instruction, and so branches to other potentially unsafe locations can be detected as erroneous, triggering an error handling response such as signalling a fault or exception. Note that both the branch-with-link instruction itself and the return branch instruction may both be treated as target checking instructions, so that both the first instruction of the function code executed at the target address of the branch-with-link instruction, and the next instruction following the branch-with-link instruction which acts as the target instruction for the return branch, would need to be a branch target instruction (BTI) in order to avoid the error handling response.

This technique can be useful for guarding against security exploits. However, if every branch-with-link instruction has to be followed by a branch target instructions then this increases the total number of instructions in the program code placing greater demands on memory, caches and pipeline utilisation.

Figure 4:
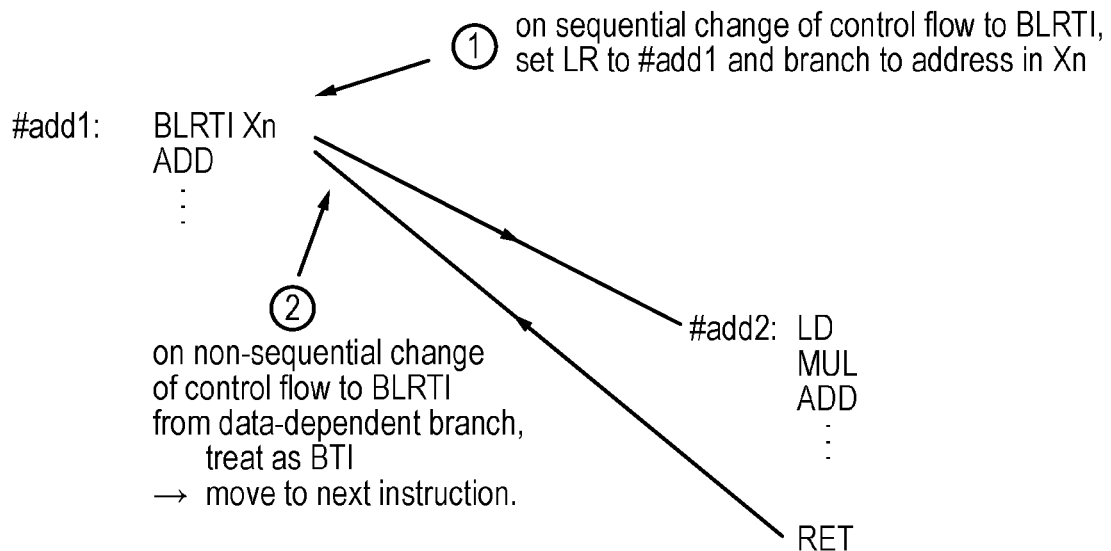
FIG. 4 shows an example of use of a branch target variant of the branch-with-link instruction.

FIG. 4 illustrates use of a branch target variant of the branch-with-link instruction (BLRTI) to help to reduce code density. It will be appreciated that the BLRTI instruction could be distinguished from the BLR instruction of FIG. 2 either through having a different instruction encoding (e.g. a different instruction opcode, or another parameter of the instruction coding specifying the particular variant) or could be distinguished through some other piece of information such as a configuration parameter stored in a configuration register, or based on the address of the branch-with-link instruction itself or based on the address of the branch which branches to the branch-with-link instruction.

The branch target variant of the branch-with-link instruction has a dual functionality. On a sequential change of control flow to the branch-with-link instruction, or a non-sequential change of control flow to the branch-with-link instruction from a branch which does not require checking of whether the instruction at the target address is a branch target instruction, the branch target variant of the branch-with-link instruction behaves as a regular branch-with-link instruction, so that it triggers a change of control flow to the instruction at the branch address if the branch is to be taken and also triggers setting of the return address. Unlike the non-branch-target variant shown in FIGS. 2 and 3, the return is set to the address #add1 of the branch-with-link instruction, rather than the address #add1+4 of the following instruction. This ensures that when the branch is taken and the function code is complete, the return branch will branch back to the branch-with-link instruction itself rather than to the next instruction.

On such a return branch, which is a non-sequential change of control flow to the branch target variant of the branch-with-link instruction triggered by a data dependent branch or other branch for which checking of whether the instruction at the target address is a branch target instruction is required, the branch target variant of the branch-with-link instruction is treated as the branch target instruction BTI. Hence, the branch associated with the branch-with-link instruction is suppressed, and so processing moves on to the next sequential instruction after the branch-with-link instruction. Hence, by allowing the same instruction to act as both branch-with-link instruction and a branch target instruction marking the valid branch point, this avoids the need for an explicit BTI instruction following the branch-with-link. As branch-with-link instructions are very common in program code, this technique can be very useful in eliminating a significant number of instructions—e.g. an estimated 6% of instructions can be eliminated for some common processing workloads.

Figure 5:
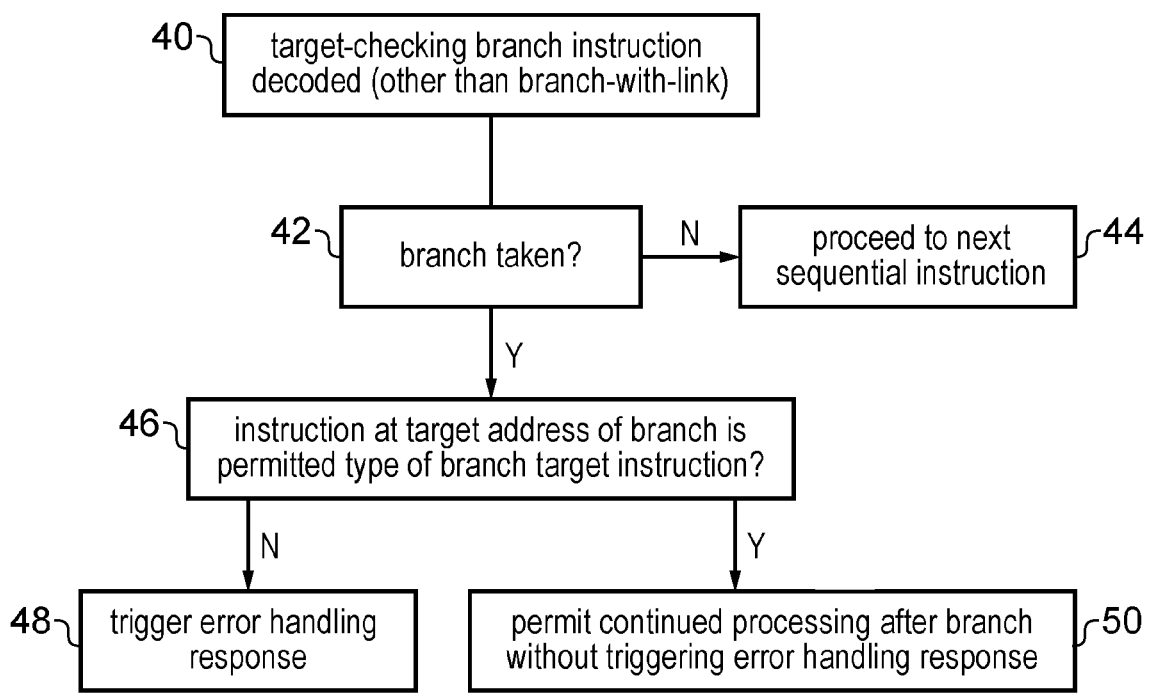
FIG. 5 is a flow diagram showing a method of processing a target-checking branch instruction.

FIG. 5 is a flow diagram showing processing of a target-checking branch instruction by the processor. At step 40 a target-checking branch instruction (other than a branch-with-link instruction) is decoded by the instruction decoder 6. Processing of a branch-with-link instruction will be discussed separately in FIG. 6 described below. In some cases, all branch instructions may be considered to be a target checking type of branch instruction. Alternatively, only certain types of branch may be considered a target checking branch instruction. For example the instruction decoder 6 may determine that a branch instruction is a target checking branch if it is a data-dependent branch whose target address depends on data specified by earlier instructions.

At step 42, the processing circuitry 4 determines or predicts whether the branch should be taken. It is common for processors to be provided with a branch predictor for predicting, before the outcome of a branch is actually known, whether the branch is likely to be taken or not taken, so that subsequent instructions can be fetched, decoded and executed before the outcome of the branch is resolved. If the branch prediction turns out to be incorrect, then processing can be rewound to the branch point and then resume with the correct branch outcome. If the branch is determined or predicted to be not taken, then at step 44 the next sequential instruction is processed without taking the branch. On the other hand, if the branch is predicted or determined to be taken then at step 46 the instruction decoder 6 controls the processing circuitry 4 to determine whether the instruction at the target address of the branch is a permitted type of branch target instruction. Which types of branch target instruction are permitted may depend on the particular type of branch being executed or could depend on other parameters such as configuration values in a configuration register which may configure the particular behaviour of the processor. If the instruction at the target address for the branch is not one of the permitted types of branch target instruction, then at step 48 an error handling response is triggered. The error handling response could be signalling of a fault or exception, which may trigger an exception handler to handle the fault and report it to the user for example. On the other hand, if the instruction at the target address of the branch is a permitted type of branch target instruction then at step 50 the processing circuitry 4 may permit continued processing after the branch without triggering the error handling response. This approach ensures that branches can only branch to certain predetermined locations in the code to restrict the scope for attackers to corrupt branch control data in order to string together pieces of code in an unintended manner.

Figure 6:
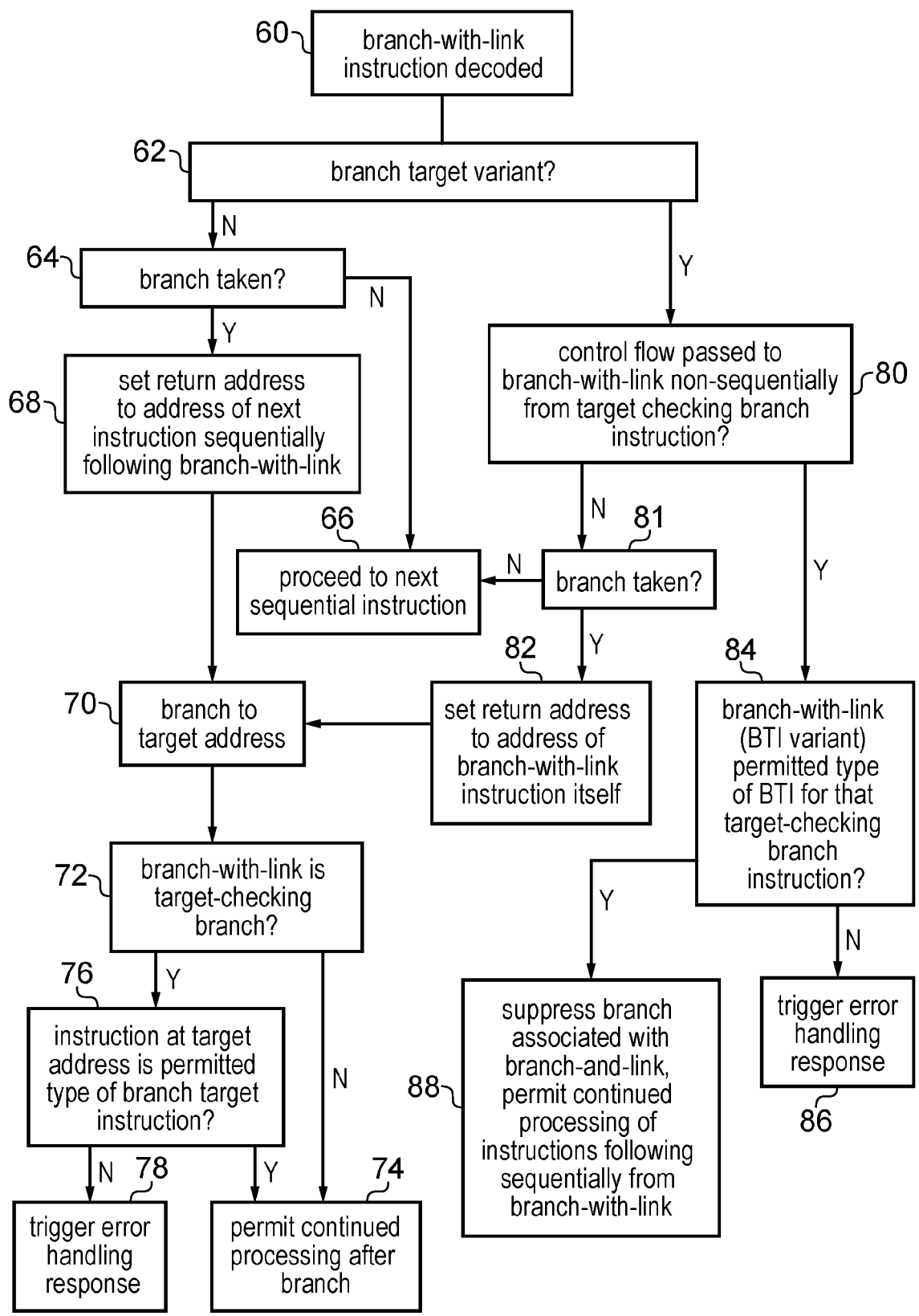
FIG. 6 is a flow diagram showing processing of a branch-with-link instruction.

FIG. 6 is a flow diagram illustrating processing of a branch-with-link instruction. At step 60, the instruction decoder decodes the branch-with-link instruction. At step 62 the instruction decoder 6 determines whether the branch-with-link instruction is the branch target variant. The variant of the branch-with-link instruction can be determined from the instruction encoding, for example from the instruction opcode or from another field of the encoding which specifies a value indicating the particular variant with the branch-with-link instruction. Alternatively, the instruction decoder 6 can determine the variant from a configuration value stored in a configuration register in the register bank 14. Also, the variant of the branch-with-link instruction could depend on the address of the branch link instruction or on the address of a preceding branch which branches to the branch-with-link instruction. In another example, if an exception has just occurred since the preceding branch was executed, then data defining the property of the earlier branch which determines the variant of the branch-with-link instruction may be determined from exception state information which was saved when the exception was taken, or from certain bits of the exception return address indicating the address from which processing is to resume following handling of the exception (these bits having been modified, when taking the exception, based on the property of the preceding branch which determines the variant of the subsequent branch-with-link instruction).

If the branch-with-link instruction is not the branch target variant, then at step 64 it is determined or predicted whether the branch is to be taken. If not, then processing proceeds at step 66 to the next instruction following on sequentially from the branch-with-link instruction, without taking the branch. If the branch is taken, then at step 68 the instruction decoder 6 controls the processing circuitry 4 to set the return address in the link register to the address of the next instruction which follows sequentially from the branch-with-link instruction. At step 70 the program flow is controlled to branch to the instruction at the target address of the branch-with-link instruction. The branch target address could be determined from a register value specified by the branch-with-link instruction, or from an immediate value, and could be defined as either an absolute address or a relative address defined relative to the program counter.

At step 72 the instruction decoder determines whether the branch-with-link instruction is a target checking type of branch instruction. If not then at step 74 processing is simply permitted to continue after the branch. However, if the branch-with-link instruction is a target checking type of branch instruction, then at step 76 the instruction decoder 6 controls the processing circuitry 4 to determine whether the instruction at the target address of the branch is a permitted type of branch target instruction. If not then at step 78 an error handling response is triggered in the same way as at step 48 of FIG. 5, while if the instruction at the target address is a permitted type of branch target instruction then at step 74 processing continues after the branch. Which types of instructions are treated as permitted types of branch target instructions for the branch-with-link instruction may vary from implementation to implementation. In some cases a general branch target instruction BTI could be treated as a permitted branch target instruction for any type of branch. In other cases, certain branch-type-specific branch target instructions may be provided which may only be validly targeted by certain types of branches.

If at step 62 the branch-with-link instruction is the branch target variant of the instruction, then at step 80 it is determined whether control flow has passed to the branch-with-link instruction non-sequentially as a result of a branch from a target checking type of branch instruction. If not, then at step 81 it is determined or predicted whether the branch is to be taken. If not, then processing proceeds at step 66 to the next instruction following on sequentially from the branch-with-link instruction, without taking the branch. If the branch is taken, then at step 82 the return address for the subsequent return branch is set equal to the address of the branch-with-link instruction itself, and then processing proceeds to step 70 where steps 70 to 78 are performed in the same way as discussed above. Hence, on a sequential change of program flow to the branch target variant of the branchwith-link instruction, or a non-sequential change of program flow to the branch target variant from a branch which is not of the target checking type, the branch-with-link behaviour is invoked, but instead of resetting the return address to the address of the next instruction as at step 68, the address is set equal to the address of the branch-with-link instruction, so that a subsequent return branch will return processing to branch-with-link instruction so that it can then function as a branch target instruction.

If at step 80 it is determined that control flow passes to the branch-with-link instruction non-sequentially from a target checking type of branch instruction (such as a data dependent branch, which may include a return branch instruction RET or a general form of branch instruction specifying the link register as its source register defining the target address), then the method proceeds to step 84. At step 84 the instruction decoder 6 or processing circuitry 4 determines whether the branch target variant of the branch-with-link instruction is a permitted type of branch target instruction for the branch which caused control flow to pass to the branch-with-link instruction. If not, then an error handling response is triggered at step 86 similar to the one triggered at step 78. However if the branch-with-link instruction is a permitted type of branch target instruction for the relevant branch then at step 88 the error handling response is suppressed. The branch associated with the branch-with-link instruction is also suppressed as it has already been carried out once and following the return branch processing should instead continue sequentially from the branch-with-link instruction. Hence continued processing is permitted for instructions following sequentially from the branch-with-link instruction. Whether the branch-with-link instruction is a permitted type of branch target instruction at step 84 may depend on the particular type of branch which caused processing to be redirected to the branch-with-link instruction. For example one type of branch target variant of the branch-with-link instruction may only be a valid branch target instruction for dedicated branch return instructions RET, while another variant of the branch-with-link instruction could be a permitted type of branch target instructions for more general branches.

Figure 7:
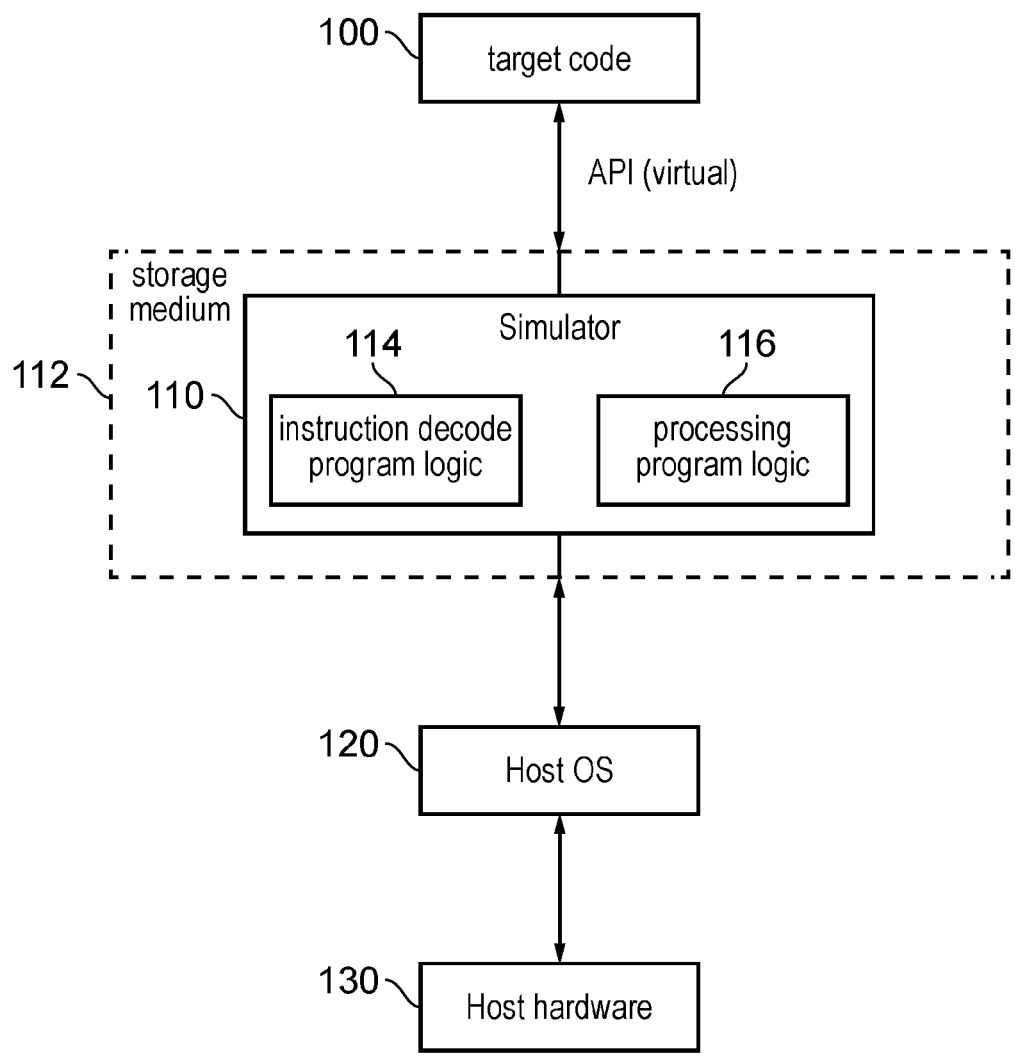
FIG. 7 shows a simulator example that may be used to implement the technique.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 130, optionally running a host operating system 120, supporting the simulator program 110. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 130), some simulated embodiments may make use of the host hardware, where suitable.

The simulator program 110 may be stored on a computer-readable storage medium (which may be a non-transitory medium), and provides a program interface (instruction execution environment) to the target code 100 (which may include applications, operating systems and a hypervisor) which is the same as the application program interface of the hardware architecture being modelled by the simulator program 110. Thus, the program instructions of the target code 100, including the branch target variant of the branch-with-link instruction described above, may be executed from within the instruction execution environment using the simulator program 110, so that a host computer 130 which does not actually have the hardware features of the apparatus 2 discussed above can emulate these features. The simulator program 110 may for example comprise instruction decode program logic 114 (e.g. a series of "if-then" statements for invoking a particular processing function selected depending on the encoding of the instruction encountered in the target code 100), and processing program logic 116 corresponding to the code of the simulator program 110 which performs the functions selected by the instruction decode program logic 114. Hence, the processing program logic 116 may include logic for providing the functionality of the branch target variant of the branch-with-link instruction as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:
1. An apparatus comprising:
an instruction decoder to decode instructions; and processing circuitry to perform data processing in response to instructions decoded by the instruction decoder; in which:

in response to a branch instruction, the instruction decoder is configured to control the processing circuitry to trigger a non-sequential change of program flow to an instruction at a target address;

when the non-sequential change of program flow is triggered in response to a branch-with-link instruction, the instruction decoder is configured to control the processing circuitry to set a return address for a subsequent return of program flow;

when the non-sequential change of program flow is triggered in response to at least one target-checking type of branch instruction, the instruction decoder is configured to control the processing circuitry to check whether the instruction at the target address is at least one permitted type of branch target instruction, and trigger an error handling response in response to determining that the instruction at the target address is an instruction other than the at least one permitted type of branch target instruction; and for at least a subset of said at least one target-checking type of branch instruction, said at least one permitted type of branch target instruction includes a branch target variant of the branch-with-link instruction.

2. The apparatus according to claim 1, in which:
in response to a branch-with-link instruction other than the branch target variant, the processing circuitry is configured to set the return address to an address of a next instruction sequentially following the branch-with-link instruction.

3. The apparatus according to claim 1, in which:
in response to the branch target variant of the branch-with-link instruction, the processing circuitry is configured to set the return address to an address of the branch target variant of the branch-with-link instruction.

4. The apparatus according to claim 1, in which:
the processing circuitry is configured to suppress a non-sequential change of program flow associated with the branch target variant of the branch-with-link instruction, when program flow passes non-sequentially from a branch instruction of said at least one target-checking type to the branch target variant of the branch-with-link instruction.

5. The apparatus according to claim 1, in which:
for a first target-checking type of branch instruction, the branch target variant of the branch-with-link instruction is one of said at least one permitted type of branch target instruction; and
for a second target-checking type of branch instruction, the branch target variant of the branch-with-link instruction is not one of said at least one permitted type of branch target instruction.

6. The apparatus according to claim 1, in which:
a first branch target variant of the branch-with-link instruction is one of said at least one permitted type of branch target instruction for a first subset of one or more target-checking types of branch instruction; and
a second branch target variant of the branch-with-link instruction is one of said at least one permitted type of branch target instruction for a second subset of one or more target-checking types of branch instruction different to the first subset.

7. The apparatus according to claim 1, in which the branch target variant of the branch-with-link instruction has a different encoding to another variant of the branch-with-link instruction which is not one of said at least one permitted type of branch target instruction.

8. The apparatus according to claim 1, in which the branch target variant of the branch-with-link instruction has a same encoding as another variant of the branch-with-link instruction which is not one of said at least one permitted type of branch target instruction.

9. The apparatus according to claim 1, in which at least one of the instruction decoder and the processing circuitry is configured to determine the variant of a given branch-with-link instruction based on at least one parameter other than the instruction encoding of the given branch-with-link instruction.

10. The apparatus according to claim 9, in which said at least one parameter comprises a configuration parameter stored in a configuration register.

11. The apparatus according to claim 9, in which said at least one parameter comprises an instruction address of the given branch-with-link instruction.

12. The apparatus according to claim 9, in which, when program flow passes non-sequentially from a given target-checking type of branch instruction to a given branch-with-link instruction, said at least one parameter comprises an instruction address of said given target-checking type of branch instruction.

13. The apparatus according to claim 12, in which in response to an exception taken between the given target-checking type of branch instruction and the given branch-with-link instruction, the processing circuitry is configured to record information for determining the variant of the given branch-with-link instruction.

14. A data processing method comprising:
in response to a branch instruction, triggering a non-sequential change of program flow to an instruction at a target address;
when the non-sequential change of program flow is triggered in response to a branch-with-link instruction, setting a return address for a subsequent return of program flow; and
when the non-sequential change of program flow is triggered in response to at least one target-checking type of branch instruction, checking whether the instruction at the target address is at least one permitted type of branch target instruction, and triggering an error handling response in response to determining that the instruction at the target address is an instruction other than the at least one permitted type of branch target instruction;
wherein for at least a subset of said at least one target-checking type of branch instruction, said at least one permitted type of branch target instruction includes a branch target variant of the branch-with-link instruction.

15. A non-transitory storage medium storing a computer program for controlling a host data processing apparatus to provide an instruction execution environment for execution of instructions of target program code, comprising:
instruction decode program logic to decode instructions of the target program code; and
processing program logic to perform data processing in response to instructions decoded by the instruction decode program logic; in which:
in response to a branch instruction, the instruction decode program logic is configured to control the processing program logic to trigger a non-sequential change of program flow to an instruction at a target address;

when the non-sequential change of program flow is triggered in response to a branch-with-link instruction, the instruction decode program logic is configured to control the processing program logic to set a return address for a subsequent return of program flow;

when the non-sequential change of program flow is triggered in response to at least one target-checking type of branch instruction, the instruction decode program logic is configured to control the processing program logic to check whether the instruction at the target address is at least one permitted type of branch target instruction, and trigger an error handling response in response to determining that the instruction at the target address is an instruction other than the at least one permitted type of branch target instruction; and for at least a subset of said at least one target-checking type of branch instruction, said at least one permitted type of branch target instruction includes a branch target variant of the branch-with-link instruction.

* * * * *